Feb. 15, 1955  C. J. EGGER ET AL  2,702,268
OIL TREATING PROCESS TO REMOVE IMPURITIES
Original Filed April 27, 1946  2 Sheets-Sheet 1

INVENTORS.
CHARLES J. EGGER
ROBERT H. WEBSTER
BY Woodling and Krost
attys

United States Patent Office 2,702,268
Patented Feb. 15, 1955

2,702,268

OIL TREATING PROCESS TO REMOVE IMPURITIES

Charles J. Egger, Westview, Ohio, and Robert H. Webster, Columbia, S. C., assignors to The Buckeye Laboratories Corporation, a corporation of Ohio Continuation of application Serial No. 665,412, April 27, 1946. This application March 22, 1951, Serial No. 216,875

1 Claim. (Cl. 196—75)

Our invention relates in general to distillation and more particularly to apparatus and process for separating fluids of divergent boiling points.

This application is a continuation of our application Serial No. 665,412, filed April 27, 1946, now abandoned.

It is a well known fact that when lubricating oils of predominantly petroleum character are used in internal combustion engines, their life of service is dependent on the rate at which contaminants increase relative to the quantity of oil used. These contaminants may be introduced extraneously or may occur as products of decomposition or of chemical change in the oil itself. Petroleum oils are generally comparatively stable, as means of refining have improved this property, but severe operating conditions may cause oxidation, or thermal decomposition, or both, to occur. The products of such deterioration include carboxylic acids, alcohols, ketones, esters, and even aldehydes, of varying molecular weights and degrees of chemical activity. Thermal decomposition alone will cause the formation of hydrocarbons foreign to the original oil, some of which are volatile while others may be of sufficiently high molecular weight as to be waxes or solids; in addition there may be ultimate destruction of some constituents to produce carbon, which persists as a solid in the lubricant, and hydrogen.

Impurities which frequently are introduced extraneously include water, either from the atmosphere or from the combustion of the fuel used, fuel which is not consumed in the normal operation of the engine or is introduced otherwise, and solid particles such as road dust, metallic particles, metallic oxides, carbonaceous matter and the like.

It will thus be seen that the volatile impurities include the oxidation and thermal decomposition products of comparatively low molecular weight, unused fuel, and water. Adverse effects have been shown to be attributable to each type. Water forms the nucleus around which sludges accumulate, the oxidation products are much more active chemically than the hydrocarbons in that they cause loss of metal in the critical mechanism by corrosion, and the volatile contaminants of hydrocarbon structure, that is, the fuel and some thermal decomposition products reduce the viscosity and other physical properties of the oil, thus affecting the film characteristics and other factors.

In the case of petroleum oils which are used in the electrical and power industries, the effects of deterioration in service have long been known to cause seriously adverse results in the operation of the equipment and apparatus in which such oils are utilized. The efficiency of hydrocarbon oils for such purposes is dependent almost completely upon the dielectric properties of these oils, and these qualities are greatly diminished by factors such as the introduction, formation, or incidence of water and of oxidation products. It has been found that the rate of formation of oxidation products is greatly influenced by the presence of water and of atmospheric oxygen and carbon dioxide, and that when the presence of these agents can be eliminated or held to an exceedingly low proportion, the useful life of these oils can be prolonged for a very considerable period of time, and that corrosion effects in the equipment become practically non-existent.

In a wide range of industrial applications, the useful life of oils is frequently found to be dependent upon the rate at which extraneous impurities are introduced, and consequently upon a critical concentration of these impurities. In quenching oils, the rate of heat transfer will be greatly affected by the presence of a small amount of water; in vacuum pump oils, air compressor oils, and adsorption oils, the incidence of gases and volatile contaminants, either in solution or present as separate phases is unavoidable from the nature of the applications and mechanisms in which the oils are employed, and removal or reduction in the amounts of these contaminants will obviously extend the length of service of such oils.

Some lubricating oils are subjected to the action of gases and volatile liquids even in applications which are totally divorced from the introduction of volatile liquids as fuels, as in internal combustion engines. For example, in the operation of steam turbines, it has been found impossible in practice to prevent the introduction into the lubricating oil of considerable amounts of condensate and gases. Removal of such contaminants will decelerate the rate of formation of oxidation products generally recognized to be undesirable.

Solid impurities can be removed from an oil by filtration, and the higher molecular weight contaminants have not been generally proven to be so greatly deleterious to the functioning of the lubricant, but in treating contaminated oils it is recognized that the total and efficient removal of the volatile contaminants has not been yet satisfactorily achieved.

Also, in the condensed silk industry and in the fruit juice industry, especially the citrus fruit juice industry it has been well known for some time that the water could be removed from the juices and milk to produce a condensed product having good nutritional properties and improved keeping qualities. However, the classical vacuum pan method of distilling away the water is the most commonly adapted method today, and flash distillation has been slow to make inroad into the practice of condensing because of many objectional characteristics to flash distillation systems. We have now removed these objectional characteristics and produced a fully satisfactory system superior to other methods used today. Further, in the citrus fruit industry especially, there are many light oils and other products that detract from the flavor of the fruit juice when condensed. Formerly, the "off" taste of condensed fruit juices was contributed mainly to scorching by the high heat method of condensing. We have found that although the high heat method of condensing does have a highly deleterious effect on the taste of the condensed juices because of this scorching, the failure to remove the oil and similar undesirable constituents has contributed largely to the "off" taste. Flash distillation was thought to be the logical solution of this problem, but has heretofore failed to find wide-place application because of incomplete removal of these volatile constituents. Although the foregoing substances have been suggested as specific examples which may be treated with our improved process and the preferred embodiment of the apparatus, the process and apparatus is desirable for use with any fluid, mixture of fluids, or solution of gases in liquids, in which there is a divergency of boiling points between the constituents.

In recent years, there has been a rapid development of flash distillation and allied processes for handling easily decomposable fluids in distillation and separation. Processes, and equipment for carrying out the processes, have been developed in recent years for such purposes as recovering of by-product organic compound; cleaning and recovery of used and contaminated oils such as lubricating and rolling oils; separating more volatile constituents from the less volatile constituents in a conglomerate mixture of fluids; and the dehydrating and degasifying fluids. Many of these processes and the equipment for the processes, have operated with only a part of the system employing the flash distillation principle, while others were directed almost in their entirety to the flash distillation principle. Further, although at first analysis they may appear quite similar, two widely divergent principles are followed in operating various types of flash distillation equipment. First of these, is the process which attempts to vaporize all but the extremely high boiling point constituents and solids. This process attempts to turn all of the fluids entering the still into gases for subsequent selective condensation. In this type of equipment and process, the gases leaving the still are generally strained through a scrubbing medium of loose materials in order to retain any entrained solid matter and unvaporized heavy liquid material. The second method, is to apply only enough heat to vaporize unwanted constituents and permit the remaining constituents to be removed from the still as a liquid.

It is the second mode of operation to which our invention relates. In the past, many attempts have been made to separate fluids of widely divergent boiling points by pumping them at a high pressure into a low pressure zone and atomizing the fluids in order that a maximum amount of surface area might be presented to the influence of the low pressure zone, and thereby throw the more volatile constituents into the gaseous phase and thus be removed from the higher boiling point constituents. However, it was always found that a considerable percentage of the material desired to be separated out was always found in the finished product when using the standard equipment for this process.

After considerable study and development, we have discovered that the weakness of the present known methods has been the failure to recognize the need for supplying the extremely large amount of sensible heat absorbed by liquid materials when volatilized and expanded. The heat absorbed by the volatilization is known technically as the heat of vaporization. We have found, that the amount of heat absorbed by the constituents being volatilized is so great that the temperature within the still was oftentimes reduced to a temperature insufficient to cause volatilization of the incoming impurities. Therefore, these impurities remain with the treated materials leaving the still. Further, it has been found that after atomizing the contaminated or mixed conglomeration of fluids a complete separation has not been accomplished by the time the spray is recollected, and therefore requires a longer exposure to the reduced pressure of the still. However, while being further exposed to the reduced pressure area, the fluids must be maintained at a high temperature level in order to continue to supply the latent heat of vaporization required for the remaining volatile constituents. That is, if the atomized fluids are allowed to contact a cold surface, or return over cold surfaces to a sump for collection, the volatile constituents have no chance to volatilize and therefore remain with the treated materials. We have found that in order to effect a complete and satisfactory separation of these volatile materials from the less volatile materials, the distillation zone into which the materials are atomized, must be maintained at substantially the same temperature level at all times, and the walls of the chamber, and other surfaces which the fluids might strike or touch, must also be maintained at substantially the same constant temperature.

Also, we have discovered that in separating volatile constituents, a type of apparatus is required that will permit the vaporized portion to be carried away, and not accumulate in dead pockets within the still. That is, if a dead pocket of the volatilized portion were to collect, and the atomized spray of incoming materials passed therethrough, the atmosphere surrounding the spray would be saturated, and the volatile constituents would remain as liquid to carry off with the liquid portion. This action is akin to human perspiration on rainy days as compared to dry days. Our improved apparatus affords complete and quick removal of volatilized materials.

Therefore, an object of our invention is to provide a process for a substantially complete separation of more volatile fluid from a conglomeration of fluids having divergent boiling points.

Another object of our invention, is to remove volatile components of a conglomeration of fluids by flash distilling the conglomeration in the form of finely dispersed particles into chamber maintained at a subatmospheric pressure, and supplying heat of vaporization and thermo-energy of expansion by direct heat to the vaporization area of the chamber in which the expansion is carried out.

Another object of our invention is to provide a chamber and means for evacuating the chamber to a subatmospheric pressure, and to provide a spray zone in the chamber with upper and side wall portions toward which the spray is directed, and further provide an outer vessel to surround at least the said upper and side wall portions, and providing a heated gaseous or liquid fluid to fill the space between the chamber wall and the outer vessel to heat and maintain the chamber walls surrounding the spray zone.

Still another object of our invention is to provide a vaporization chamber having chamber walls sealed vacuum tight enclosing a heated top area and a sump area, with the sump area of the chamber being out of the heated area of the chamber to collect liquid therein and further expose the liquid to the low pressure within the chamber without adding heat energy to the liquid.

And another object of our invention is to separate components of a conglomeration into liquid and gaseous phases by distillation under vacuum within a chamber, wherein the chamber is heated in its upper region to supply the necessary heat of vaporization to volatilize some components of the conglomeration, and the lower sump area is unheated to collect the remaining liquid phase under high vacuum conditions, but without the addition of further heat.

Other objects and a fuller understanding of our invention may be had by referring to the following description and claim, taken in conjunction with the accompanying drawings, in which:

Figure 1:
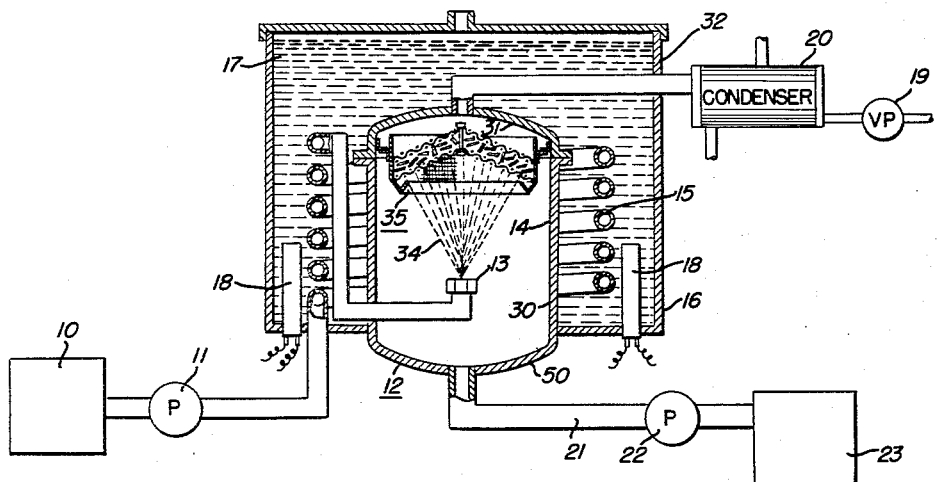
Figure 1 is a cross-sectional view of an apparatus embodying the features of our invention and capable of carrying out our process.

To achieve separation of volatile constituents from a conglomeration of fluids having varying degrees of volatility, it is necessary to use some convenient form of distillation, and all known methods of re-refining oils and condensing of fruit juices and other conglomerations contemplate the use of this type of physical action. Many means have been devised to accomplish this separation rapidly, completely, and efficiently, but all have comprehended the separation being done by distillation of considerable quantities of the conglomeration. Consequently, an appreciable time interval elapses between the introduction of heat and pressure change and completion of the removal of the material to be separated out, and to accomplish final removal of the last traces of the volatile material to be separated out from the body of the conglomeration, thermo energy is applied at an increasing rate. While this is being done, conditions exist in the body of the conglomeration frequently favorable to break down some of the normal constituents, with formation of additional products of lower molecular weight, and consequently of lower boiling point, usually sufficient in degree and amount to cause them also to be classified as volatile constituents to be removed. Before a completely desirable result is achieved, it is frequently found that the final yield of the desirable end products free from the constituents to be volatilized has been unsatisfactory from an economical standpoint. If the distillation be not carried on with this degree of thoroughness, in the case of contaminated oils for example, the presence of constant boiling mixtures will frequently cause the final product to be considered not totally satisfactory in regard to flash point, the characteristics most usually employed in evaluating the freedom or otherwise of an oil from low boiling components. If, however, a comparatively small amount of oil, or citrus and other fruit juices, or milk, or other conglomerate fluid, be subjected to a distillation process as described at sub-atmospheric pressure, and if this quantity be extended to present the greatest possible surface to this action, it is found that the removal of undesirable low boiling constituents is achieved with a degree of completeness not previously possible, and in a period of time which does not permit any observable degradation of the remaining components. In order to present a maximum surface, it is necessary to either present a continuous film of negligible thickness, or to disperse the conglomeration in exceedingly fine globules. The existence of either of these forms must persist for a period of time sufficient to assure the removal in vapor form of the constituents to be volatilized. From the standpoint of control of operating conditions, it has been found to be more satisfactory to present globular particles to the combined action of heat and reduced pressure than to extend a continuous film, only one surface of which can be presented to the sub-atmospheric pressure and spaces.

One of the features of our invention is the provision of heat for the walls of the chamber independently of the heating of the conglomeration to be treated. We have found by experiment, that when a heated conglomeration is sprayed into a chamber at sub-atmospheric pressure the walls of which are free to the atmosphere, and consequently maintained at substantially atmospheric temperature, vaporization of the volatile components will occur to a very appreciable extent, and if the fluid is first raised to a temperature sufficiently high to assure enough heat energy for expansion of the conglomeration and latent heat of vaporization of the constituents to be volatilized, it is entirely possible that removal of the constituents to be volatilized will approach completeness. If, however, the vaporized constituents have occasion to come in contact with the walls of the vessel, which are at a much lower temperature, condensation occurs on the walls to an appreciable extent, and the condensed volatile contaminants will flow down the sides of the vessel and combine with the desirable end products which have been free from the volatilized constituents by the fractional distillation which has already occurred. The final result is therefore that the volatile constituents are removed from the conglomeration being treated and subsequently reincorporated to a considerable degree.

Although we have illustrated one type of apparatus used in carrying out our process, said apparatus is more or less diagrammatic in that other shapes and forms of the inner and outer vessels, as well as other types of spray nozzles and baffle means might be employed while still staying entirely within the spirit and scope of this invention. Thus, throughout the disclosure and claims we indicate that the conglomeration should be sprayed in the form of small discrete particles toward the top and upper side walls of the chamber. Although in some instances it is desirable to provide an inner evacuated chamber which will be completely surrounded by a heating medium, as shown in our Patent No. 2,451,668, we have found that in many instances it is desirable to provide a chamber which extends to the atmosphere at the bottom in order to provide a sump 50 which is not supplied with heat, to hold the treated material.

We have found that by maintaining the walls in the chamber in the area of the spray and evaporation, that is at the top and upper side portions of the chamber, at an elevated temperature, we have contributed substantially to the efficiency of the process. We have found that the walls of the chamber should be maintained substantially equal to, or slightly above, the temperature of the conglomeration of fluid at the point of introduction into the chamber. By maintaining the walls at a temperature as just described, we have fulfilled two conditions necessary for successful operation. In the first place, for successful operation, there must be no flow of heat from the conglomeration, or from the vaporized volatile portion to the wall. To allow such flow of heat would result in condensation of the volatilized portion with the result that the volatilized portion would be returned to the treated material. Secondly, because a large amount of heat is required to supply energy for expansion of the conglomeration within the chamber and to supply the latent heat of vaporization for the removal of the volatile portion, supplying additional heat to the walls of the chamber to the conglomeration in the region of the spray zone reduces need for heating the original conglomeration to an unduly high temperature in an effort to supply the heat directly to the conglomeration before entering into the chamber, that is, the original conglomeration may be heated to a safe temperature limit before being spray atomized into the chamber, and the additional heat required for the expansion and vaporization is readily supplied through the walls of the chamber as it is required.

Our invention comprehends the application of the principles explained in the manner which is efficient and economical. The preferred apparatus employed is shown in the drawings and the process will be understood when reference is made to them while the operation is explained.

Figure 2:
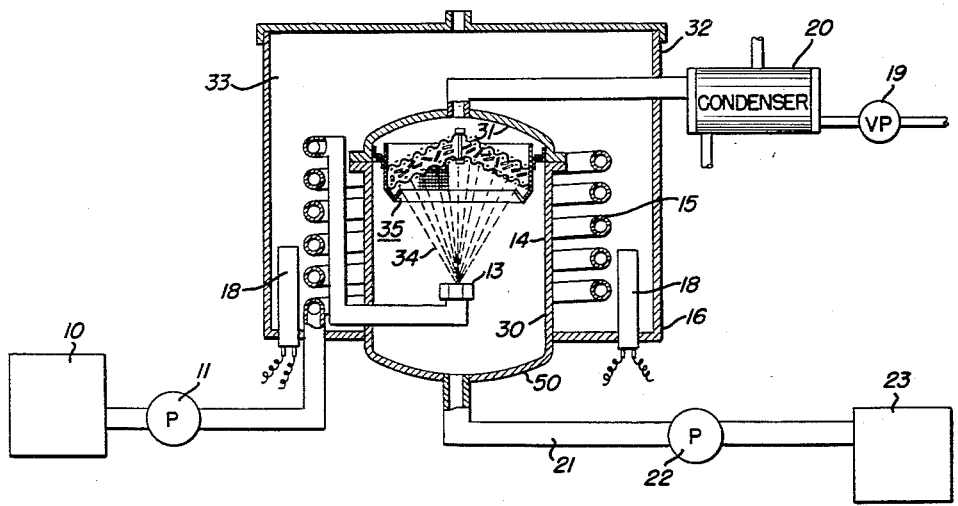
Figure 2 is a modification of Figure 1, in that a gaseous heating medium is provided.

As will be seen, apparatus for carrying out one embodiment of our process wherein the fluid preheat and the thermal supply for the chamber walls is from one heat source as illustrated in Figures 1 and 2, and consists of a means of supplying fluid from a supply vessel 10 by a pump 11 to a chamber 12 in which the fluid, by reason of passage through a spray nozzle 13, is dispersed into exceedingly fine globular particles projected into a chamber 30 enclosed by walls 14 and a top 31. The fluid in passing from the pump 11 flows through a series of coils 15 which are immersed in a heat transfer medium within a container 16. The heat transfer medium may be a fluid 17, Figure 1, or a gas (air) 33, Figure 2. The heat transfer liquid 17 may be heated in any suitable manner and, as illustrated, we provide for heating the liquid by means of electric heaters 18 suitably energized from a source of electrical energy. The chamber 12 is maintained at sub-atmospheric pressure by means of a vacuum pump 19. As illustrated, a condenser 20 is connected between the chamber 12 and the vacuum pump 19 in order to condense the volatile contaminats which are carried off by the action of the vacuum pump 19.

The fluid in passing through the series of coils 15 is heated by the heat transfer liquid before being introduced into the chamber 12. The heat transfer liquid 17, in carrying out one embodiment of our process, also heats the walls 14 of the chamber 12 at a temperature substantially at least as high as the temperature of the fluid which is introduced into the chamber 12 in order to prevent condensation of the vaporized volatile constituents within the chamber 12. The constituent of the conglomeration which remains fluid is removed from the sump 50 through a conduit 21 under the action of a pump 22 which delivers the treated fluid to a storage vessel 23. The treated fluid is removed through the conduit 21 from the chamber 12 at such a rate that no great accumulation of fluid is present at any time in the sump 50 to decrease its effective space or capacity. Actually the rate of removal is substantially the same as the rate of introduction of fluid into the chamber, but before withdrawal is first commenced, the liquid pool is allowed to accumulate in the sump 50. The liquid will not flow out of the sump by gravity, because of the high vacuum, but must be pumped out by the pump 22. Therefore, no valve or trap of any kind is needed in the sump of the chamber. The process may be carried out continuously without interruption and tests show that the process and equipment when treating contaminated oil, restore the oil substantially to its original constituency.

Referring to oil as an example only, we have found that by employing the process herein described, a product is obtained which is equivalent to the original oil in all physical respects, showing complete removal of all volatile contaminants, and this result is obtained at temperatures very substantially lower than those which are necessary when batch vacuum distillation is used and which are below the critical temperatures for thermal decomposition. Thus, we have found that diluents which had been introduced into aircraft engine oils in service to the extent of approximately six per cent of the total volume, and which consisted of volatile hydrocarbons, such as are present in gasoline, together with some low molecular weight oxidation products and water were apparently totally removed by spraying the contaminated oil which had previously been heated to 300° F. into the distillation chamber, which was maintained at a vacuum of approximately 29.6 inches of mercury as referred to a 30-inch barometer, the walls of the chamber also being maintained at 300° F.

The flash point of the aircraft engine oil was 480° when new and the contaminated oil contained a sufficiently high proportion of very volatile hydrocarbons that the flash point was approximately 115° F., and sustained combustion occurred at 155° F. After subjecting the contaminated oil to the process described above, the product had a flash point of 495° F. Similarly, the viscosity of the contaminated oil was very much less than that of the new oil, while the viscosity of the product after treatment was substantially identical with that of the new oil.

Determination of the value for the physical properties usually accepted for evaluation of an oil showed that after the contaminated oil had been fractionally distilled by the process which we have discovered, the product met the requirements specified for new aircraft oil.

While these results show that the limiting conditions for removal of volatile contaminants had been met in every case, to extend the results in the general field of oil contamination, particularly petroleum oil contamination, series of tests were made with an electrical oil, specifically a transformer oil, and with an oil used in the heat treatment of steel.

In the case of the contaminated transformer oil, it was found that the oil before treatment was dark in color, possessed a neutralization value of 0.53 milligram KOH per gram of oil, and a dielectric strength of 7 kilovolts when tested by the standard method of test described by the A. S. T. M. Some sludge was present, and the moisture content was found to be 0.27% by distillation for xylene.

This contaminated oil was subjected to vacuum fractional distillation by the method we have disclosed above, at a temperature of 200° F. and without the use of a sweeping agent. Preliminary to spraying the contaminated oil into the distillation chamber, it was strained to remove solid impurities and aggregations of sludge which would clog the spray nozzle.

The oil collected after subjection to this treatment was then analyzed and the neutralization value was found to be 0.21 mg. KOH per gram of oil, the moisture content was nil by the same method of distillation from xylene, and the dielectric strength was 24 kilovolts. In addition, the product was substantially lighter in color than the contaminated oil before treatment. Subsequent filtration may be used, if desired.

The utilization of the process had therefore resulted in the elimination of water and in reduction of the neutralization value of the oil, which can only be ascribed to removal of volatile oxidation products such as carboxylic acids and esters, compounds which are sufficiently active, in a chemical sense, to cause deterioration of the equipment in which they may come in contact. The increase in dielectric strength is likewise ascribed to removal of these volatile contaminants, since it is well known that mechanical dispersions of water and the presence in solution of substances relatively rich in oxygen will materially decrease the efficiency of transformer oils and of hydrocarbon dielectrics in general.

With regard to the oil which was used for the heat treatment of steel, it had been discovered in the commercial application for industrial production, that after a certain degree of contamination had occurred, the rate of heat dissipation had been accelerated to the point where surface hardening or "brinelling" was prevalent, and persisted to an extent which either militated against subsequent machine finishing operations, or resulted in the rejection of the steel, because of failure to meet manufacturing specifications.

The rate of heat transfer is analogous to the rate of transfer of electrical energy in that the same contaminants, and degree of concentration of these contaminants, will affect these properties in like manner, although there may be a difference in the final permissible limits.

The heat transfer oil, or quenching oil, which was used for the experiments herein described, had been rejected as unfit for further use in industry. On analysis, it was found to contain a small amount of free water, and the neutralization value was very much higher than that of the oil originally.

This contaminated oil was heated to a temperature of approximately 250° F., and sprayed into the evacuated distillation chamber, the walls of which were maintained at substantially the same temperature as the oil being treated, and the volatile contaminants vaporized and removed in the vapor form. In some of the experiments, steam was used as a sweeping agent, and it was found that by the use of this sweeping agent, the rate of treatment could be increased to some extent without deleteriously affecting the quality of the treated oil. In all cases, it was possible to produce an oil which possessed physical properties equal to or approximating those demanded in purchase specifications for new oil for the designed application. More significantly, when oil which had been contaminated in service and subsequently subjected to our process as described above was replaced into commercial use, it was found to function in a completely satisfactory manner. While the scientific study of service contamination of quenching oils is not nearly as complete or thorough as similar studies made for electrical and lubricating oil deterioration, a broad survey of the results so far available shows that the progressive formation or incidence of volatile oxidation products and of water, and of extraneously introduced contaminants or catalysts for the production of contaminating products result in a parallel deterioration affecting the quality of the metal products treated therein, and that a limit of usefulness is reached in a sufficiently short period of time. Interruption of production and cost of replacement therefore contribute a substantial portion of production costs for the metal products which have to be subjected to this treatment. When means for treating such oils by our process are provided in conjunction with the heat treating bath, the life of the heat transfer medium has been prolonged to a period exceeding several times that of mediums used in identical applications but where the treatment has not been made available.

It may therefore be stated that in commercial applications of hydrocarbon oils of predominantly petroleum origin, the useful life of such oils varies directly with the rate of accumulation of service contaminants, and that a serious proportion of these contaminants are products of oxidation or thermal decomposition which are substantially more volatile than the hydrocarbon from which they are derived, together with water formed as a product of decomposition or otherwise introduced. If these volatile contaminants are removed totally or are kept below a predetermined critical concentration, dependent upon the application, the useful life of these oils may be prolonged to an extent which will greatly affect the economic operation of the equipment in which they are employed, and in addition will reduce substantially the degree to which deterioration products may adversely affect the materials of which the equipment is compounded. The process and apparatus we have disclosed provide a convenient and efficient means for accomplishing the removal of such volatile deleterious agents and are capable of incorporation in a wide variety of useful commercial applications.

Many of the oils, as well as some of the fruit juices and the milk, were found to have gaseous materials occluded therein, but no longer dissolved or chemically affiliated. To complete separation in these materials, and yet not cause deterioration by a prolonged exposure of the liquid phase to heat, the sump 50 was provided. The liquid material may be collected for a period of time in the sump 50 to allow the bubbles to seep out of the liquid, but no further heating is applied. The time which the liquid remains in the sump 50 is quite short, a minute or two, but is extremely long in comparison to the time it would be in the vacuum chamber if removed immediately after accumulated.

Nor is it satisfactory to attempt to pump the treated liquid to a separate vacuum storage tank, for such pumping necessarily means a raise in pressure, which pressure increase may again incorporate the bubbles into the treated liquid.

Figure 3:
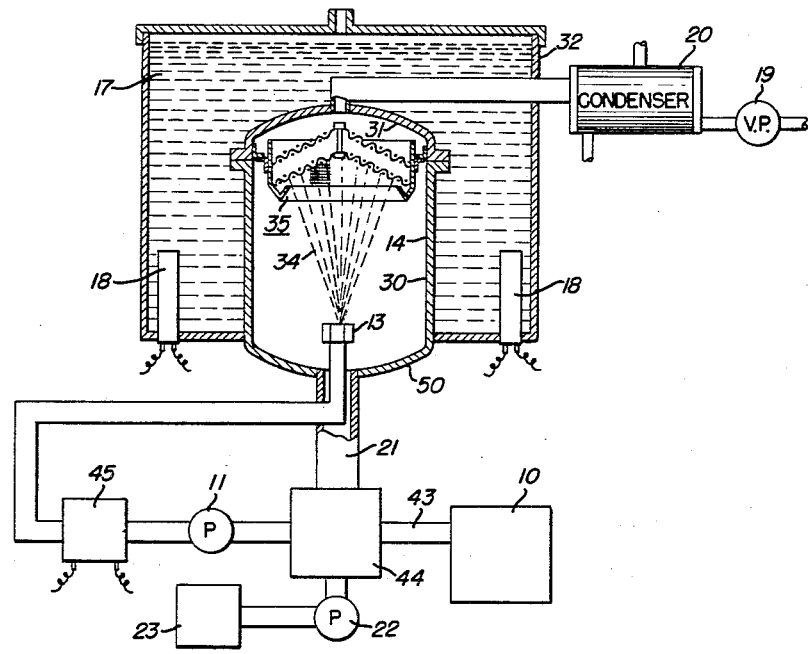
Figure 3 is a further modification wherein an external heater is provided for independently heating the conglomeration of fluid being sprayed into the apparatus separate from the heating of the chamber.
Figure 4:
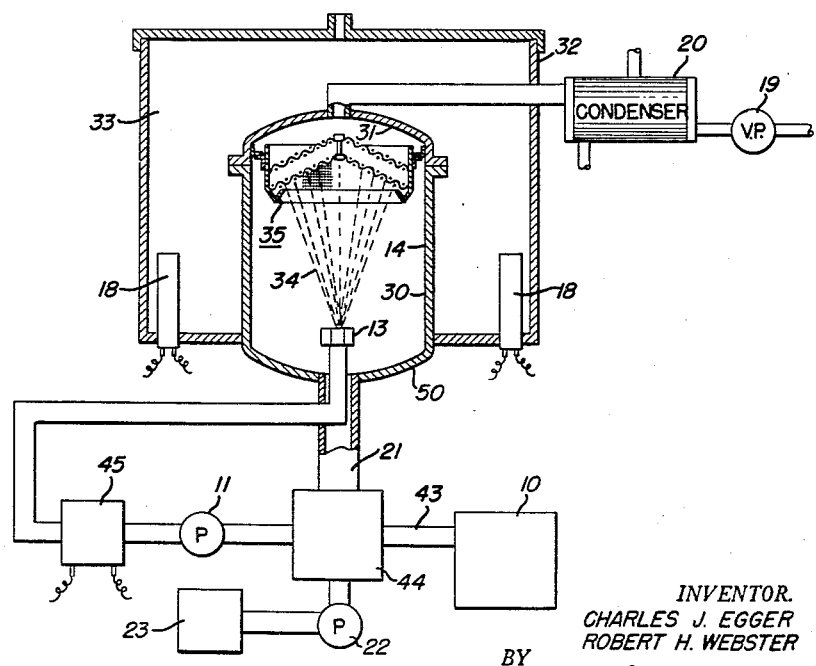
Figure 4 is similar to the apparatus of Figure 3, but is provided with a gaseous heating medium to surround the inner chamber.

In the Figures 3 and 4 of the drawings, we illustrate a modification of our apparatus for carrying out our improved process. In this embodiment, we have dispensed with the coils 15 to preheat the conglomeration before it is introduced into the chamber 30, and have substituted external heating means. The chamber walls 14 and top 31 are independently heated from a heat transfer medium as previously described. Thus, we are able to obtain a finer degree of control over the preheating temperature of the conglomeration, and the amount of heat supplied to the chamber walls to the spray zone. That is, a low preheat may be desirable in some fluids, and a high degree of heat supplied to the chamber walls to supply the heat of vaporization and expansion. On the other hand, it may be desirable to provide a greater amount of heat directly to the conglomeration by preheating, and furnishing only enough heat to the chamber walls to maintain the chamber walls at the elevated temperature or to supply a relatively small amount of heat therethrough to the spray zone. In any event, the requisite for carrying out our process in this embodiment of the apparatus is to employ a means of supplying the conglomeration from a supply tank 10 to a supply line 43. The conglomeration is preheated by passing through a heat exchanger 44 and is placed under a relatively high pressure by a pump 11. The conglomeration then progresses to a heater 45 which may be conveniently heated by electrical heating elements of any suitable design, or by steam or other suitable devices if desired. The conglomeration is then introduced into the evacuated chamber 30 by spray atomizing the same through the spray nozzle 13 whereby it is dispersed into exceedingly fine globular particles projected into the spray zone enclosed by the chamber walls 14 and top 31. The chamber 30 is maintained at subatmospheric pressure by means of the vacuum pump 19. The treated components are removed from the chamber 30 through a conduit 21 and pass through the heat exchanger 44 where the sensible heat contained therein is transferred to a certain extent to the incoming conglomeration as previously described.

In this illustrated embodiment of our invention, we have illustrated a container 32 as surrounding the top and side portion of the chamber 30, but we have provided for the sump 50 of the chamber 30 to extend from the container 32 and be exposed to the atmosphere. Thereby, the treated liquid gathering in the sump 50 prior to being removed therefrom, will not be exposed to continued heating from the heated medium within the space 33. This feature is particularly desirable when treating fruit juices, milk, or other easily disintegrated material. Therefore, the action of the heating, spray atomizing, volatilization, and recondensation is over so quickly that the treated material will not experience a change of composition to affect the taste, color or desirable properties easily affected by prolonged exposure to elevated temperature. The atomized material is indicated by the reference character 34 and is so directed by the spray nozzle 13 that it impinges against a fluid surface exposing device 35 where the atomized material is collected as a thin film and is outwardly dispersed to collect and drip to the bottom sump 50 of the chamber 30 at a radial distance from the spray nozzle 13.

The treated components are removed from the chamber 30 through a conduit 21 and may be passed through suitable heat exchangers if desired to transfer the physical heat contained therein to a certain extent to the incoming conglomeration. The treated materials may be maintained at a constant level in the sump or bottom portion of the chamber by means of constant level devices or by the rate of pumping from the chamber. Thus, the treated material may be exposed for a further period of time to the low pressure of the chamber, but will be in contact with the unheated bottom portion of the chamber. No accumulation is permitted beyond the bottom sump region of the chamber 30, whereby the effective space or capacity of the chamber would be decreased. The process may be carried out continuously without interruption, and tests show that process and equipment affords substantially a complete separation as desired.

Basically, throughout all our steps of treatment, our process remains the same. The apparatus which we have shown and described are convenient and preferred forms of apparatus, but are all designed to carry out the basic process step. Briefly, this process comprises the steps of heating the fluid to be treated at a predetermined pressure, to a temperature which is above the temperature that would cause boiling of the highest boiling point constituent to be removed at a pressure less than said predetermined pressure. That is, the conglomeration of fluid comprising at least two constituents having divergent boiling points, are heated before entering into the spray chamber. The temperature to which the conglomeration is heated is determined by the degree of vacuum within the spray chamber. Therefore, the conglomeration is heated to a temperature at least equal to, but preferably slightly above, the temperature that would cause the constituent to be removed to boil if that constituent were placed in the reduced pressure of the spray chamber. Thereafter, the heated conglomeration is spray atomized in the form of exceedingly fine globular particles into the high vacuum spray zone. At this point in the process, an instantly available supply of heat energy is required in the region of the spray zone to furnish at least a portion of the heat of vaporization of the volatile constituents and to maintain the spray zone at the temperature described as that temperature which would cause boiling of the highest boiling point constituent to be removed. This instantly available supply of heat energy must be available in the region of the spray zone.

The process and apparatus described herein has not been limited to any specific fluid or conglomeration of fluids, because we have found that the device and process is equally successful with a large number of various fluids. For example, this process and equipment has been used successfully for restoring various contaminated oils such as heat transfer oil used for quenching purposes in hardening of steel, electrical insulating oil, engine oil, lubricating oil for vacuum pumps and the like, refrigerator lubricating oils, for degasifying beverage waters, and for degasifying and dehydrating various fluids. That is, the process and equipment is equally successful for removing undesirable constituents, for dehydrating, and for degasifying. Also, it has been found that each fluid treated requires a different temperature, pressure, and vacuum. Thus, whereas one fluid may require a relatively high preheat temperature, another fluid may actually require refrigeration before being atomized within the expansion chamber. In all cases, however, the walls of the expansion chambers are easily adjusted in temperature to maintain them at exactly the proper temperature to conduct sensible heat therethrough to maintain the interior of the chamber at exactly the desirable degree of temperature while in operation, but the sump 50 remains cool.

Although we have described our invention with a certain degree of particularity in its preferred form, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

The process of treating oil to remove constituents thereof by volatilization, comprising the steps of heating the oil at a predetermined pressure, to a temperature which is above the temperature at which the highest boiling point constituent to be removed would boil under a pressure less than said predetermined pressure, thereafter spray atomizing said oil in the form of exceedingly fine globular particles into a spray area defined by a chamber having walls sealed vacuum tight, simultaneously withdrawing gases from said chamber to reduce the pressure within the chamber to a value which will cause the highest boiling point constituent to boil at the temperature to which it has been heated, and also remove the volatilized constituents of the oil, and also simultaneously with said spray atomizing providing an instantly available supply of thermal energy by radiation into said spray area to furnish at least a portion of the heat of vaporization of said constituents to be volatilized and maintain said spray area at a temperature at least equal to the boiling point, at the reduced pressure, of the highest boiling point constituent to be removed and control the volatilization thereof and maintain other constituents of higher boiling points as a liquid, collecting said liquid constituents in a sump area under the influence of the high degree of vacuum but out of said heated spray area for a period of time which is extended in comparison to the time required to atomize and recollect the material, and removing the said liquid constituents which remain liquid from the sump.

References Cited in the file of this patent

UNITED STATES PATENTS

| | | |
|---|---|---|
| 2,451,668 | Egger et al. | Oct. 19, 1948 |
| 2,575,051 | Egger et al. | Nov. 13, 1951 |